(12) United States Patent
Braga et al.

(10) Patent No.: US 11,315,051 B2
(45) Date of Patent: Apr. 26, 2022

(54) WORKFLOW FOR DEFINING A MULTIMODAL CROWDSOURCED OR MICROTASKING PROJECT

(71) Applicant: DefinedCrowd Corporation, Seattle, WA (US)

(72) Inventors: Daniela Braga, Bellevue, WA (US); Joao Freitas, Almada (PT); Sara Oliveira, Setubal (PT)

(73) Assignee: DefinedCrowd Corporation, Seattle, WA (US)

( * ) Notice: Subject to any disclaimer, the term of this patent is extended or adjusted under 35 U.S.C. 154(b) by 320 days.

(21) Appl. No.: 15/977,645

(22) Filed: May 11, 2018

(65) Prior Publication Data
US 2018/0330311 A1  Nov. 15, 2018

Related U.S. Application Data (60) Provisional application No. 62/505,687, filed on May 12, 2017.

(51) Int. Cl.
*G06Q 10/06* (2012.01)
*G06Q 30/02* (2012.01)

(52) U.S. Cl.
CPC . *G06Q 10/063118* (2013.01); *G06Q 10/0633* (2013.01); *G06Q 30/0201* (2013.01)

(58) Field of Classification Search
CPC ....... G06Q 10/063118; G06Q 10/0633; G06Q 30/0201
USPC ...................................................... 705/7.17
See application file for complete search history.

(56) References Cited

U.S. PATENT DOCUMENTS

| | | | |
|---|---|---|---|
| 9,712,576 B1* | 7/2017 | Gill | G06N 5/04 |
| 2007/0300174 A1* | 12/2007 | Macbeth | G06Q 10/10 |
| | | | 715/772 |
| 2012/0143952 A1* | 6/2012 | von Graf | G06Q 10/10 |
| | | | 709/204 |

(Continued)

OTHER PUBLICATIONS

Yan, Demo Abstract: mCrowd—A Platform for Mobile Crowdsourcing, Proceedings of the 7th ACM conference on embedded networked sensor systems, 347-348 (2009) (Year: 2009).*

(Continued)

*Primary Examiner* — Charles Guiliano
(74) *Attorney, Agent, or Firm* — Perkins Coie LLP (57) ABSTRACT

A facility for providing a workflow tailored to defining a project for collecting multimodal data from each of a set of crowdsourcing or microtasking platform workers is described. The facility enables customers of a crowdsourcing or microtasking platform to easily define multimodal data collection projects. The facility enables customers to define any of the following types of information associated with multimodal data collection projects: worker requirements, project environment parameters, video data, audio data, physiological data, and/or location-related data. Some of this data is collected using different kinds of sensors in one or more devices (e.g., smart phones, fitness wearables, etc.) associated with the crowdsourcing or micro-tasking platforms' workers. Prior to computing data results generated by executing a multimodal data collection project, the facility an align at least a first portion of the collected data with a second portion of the second data.

22 Claims, 8 Drawing Sheets

(56) References Cited

U.S. PATENT DOCUMENTS

2015/0088624 A1* 3/2015 Frederick ........... G06Q 30/0209
　　　　　　　　　　　　　　　　　　　　　　705/14.12
2017/0308805 A1* 10/2017 Altamirano ............. E21B 47/00

OTHER PUBLICATIONS

Xu, et al., Incentive Mechanisms for Time Window Dependent Tasks in Mobile Crowdsensing, 14 IEEE Transactions on Wireless Communications 6353 (2015) (Year: 2015).*

* cited by examiner

Environment Setup

Recording Environment\*
- Home
- Living room only
- Office
- In-Car

— 421

Noise Conditions\*
- Noisy
- Quiet

— 422

Optimal Recording Distance\* e.g. 450 cm
e.g. 450 in

— 423

Drag & drop a txt file (UTF-8) with your scenarios:*
Only one scenario (200 characters maximum) per line. A scenario should clearly describe the spontaneous scenario. For example, "Tell your mother you are arriving late for dinner.".

Your files

Click or drop files here to upload

ADD FILE +

FIG. 8

WORKFLOW FOR DEFINING A MULTIMODAL CROWDSOURCED OR MICROTASKING PROJECT

CROSS-REFERENCE TO RELATED APPLICATION(S)

This application claims the benefit of U.S. Provisional Patent Application No. 62/505,687 filed on May 12, 2017, entitled WORKFLOW FOR DEFINING A MULTIMODAL CROWDSOURCED OR MICROTASKING PROJECT, which is incorporated herein by reference in its entirety.

BACKGROUND

In a crowdsourcing or microtasking platform, workers are paid to perform tasks via the web, typically viewing prompts, listening to audio, viewing images/videos, and providing responses.

DETAILED DESCRIPTION

The inventors have noted that the accelerating consumer penetration of advanced personal electronic devices significantly increases the likelihood that a meaningful number of the people in a crowdsourcing or micro-tasking platform's worker pool will have access to a number of different kinds of sensors. For example, modern smartphones typically have microphones, image sensors, location and orientation sensors, accelerometers, gyroscopes, pedometers, magnetometers, compasses, proximity sensors, photometers, barometers, thermometers, air humidity sensors, ionizing radiation sensors, etc. Fitness wearables often have sensors to detect heart rate, respiration rate, electrodermal activity, blood oxygen saturation, blood spectrometry, physical activity type, temperature, elevation, location, orientation, acceleration in 1-3 dimensions, ambient light level, etc.

The inventors have further recognized that customers of crowdsourcing or micro-tasking platforms may benefit from performing data collection projects in which the same set of workers collect multiple types—or "modes"—of data using sensors of one or more modern electronic devices to which they have access. The inventors have also recognized that it would benefit such customers to have use of a single workflow tailored to defining a project for collecting multimodal data from each of a set of workers.

Accordingly, the inventors have conceived and reduced to practice a software and/or hardware facility for providing a workflow tailored to defining a project for collecting multimodal data from each of a set of crowdsourcing or micro-tasking platform workers ("the facility"). The facility enables customers of a crowdsourcing or micro-tasking platform to easily define multimodal data collection projects.

Figure 1:
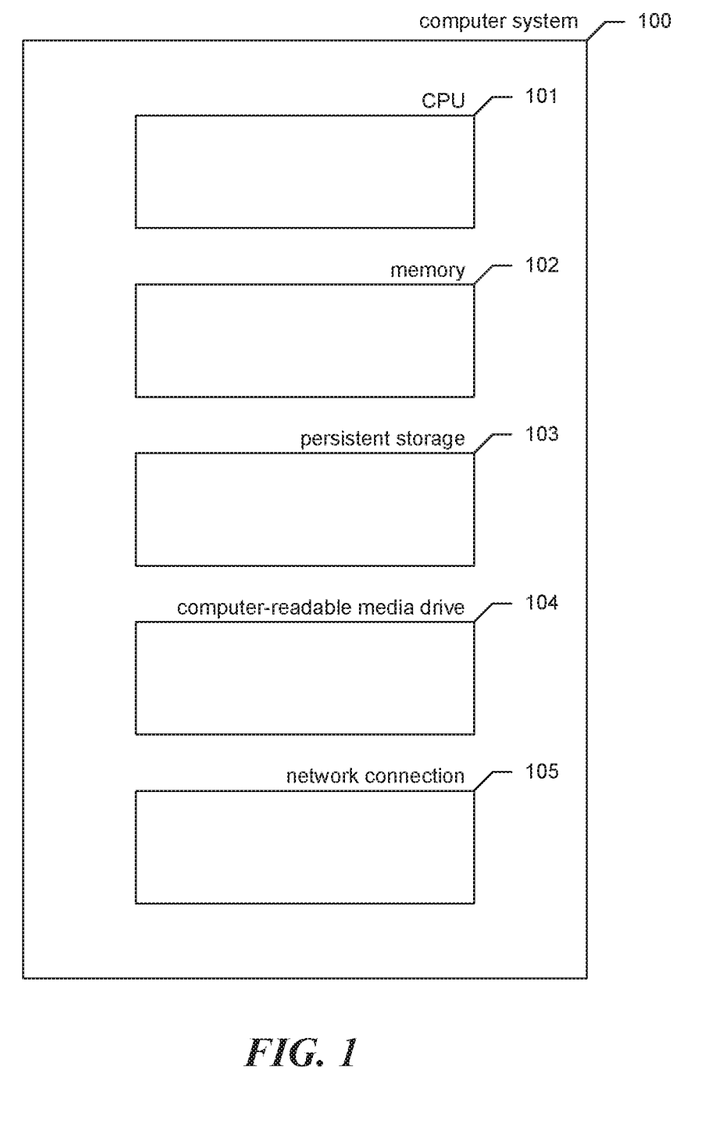
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
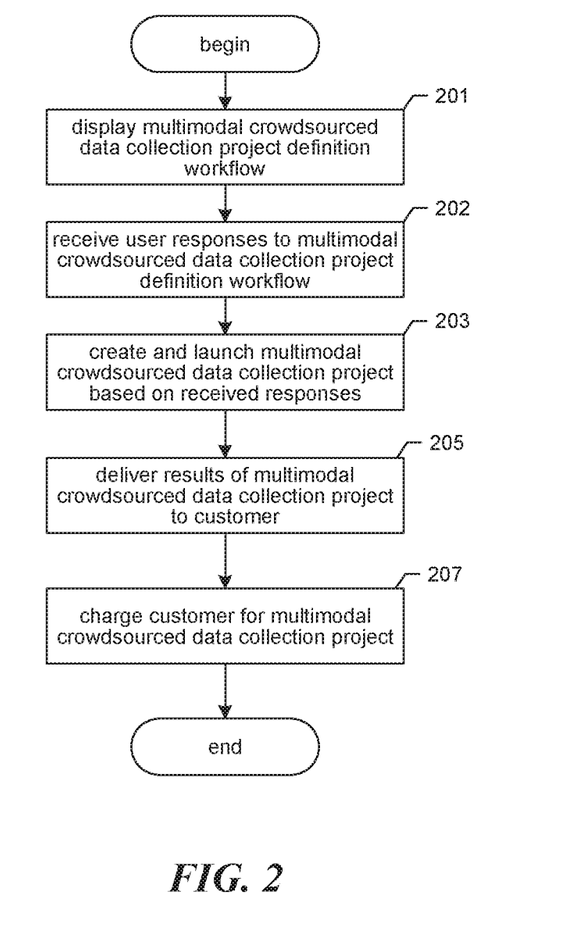
FIG. 2 is a flow diagram showing a process performed by the facility in some embodiments.

FIG. 2 is a flow diagram showing a process performed by the facility in some embodiments. In step 201, the facility displays to a customer of a crowdsourcing or micro-tasking platform a workflow for defining a multimodal crowdsourced data collection project. An example of such a workflow is shown in FIGS. 3-7, discussed below. In step 202, the facility receives responses from the customer to the workflow displayed in step 201. In step 203, the facility creates and launches on the crowdsourcing or micro-tasking platform a multimodal crowdsourced data collection project in accordance with the responses received in step 202. For example, after the facility creates and launches such a multimodal crowdsource data collection project, it can then monitor and receive data from one or more crowdsourcing or micro-tasking platform's workers. The data can be collected using one or more sensors associated with the workers. For example, when a workflow customer selects collection of heartrate data, the facility can receive workers' heartrate data that is collected using one or more sensors in the workers' fitness wearables. In some embodiments, the collected data can be used to further refine requirements and parameters of the multimodal crowdsourced data collection project. In some embodiments, the facility can process and align the data (e.g., signal data) collected from the sensors before combining it to compute results. For example, to synchronize signal data, a pattern (e.g., a peak burst) is emitted/received as part of conducting the multimodal crowdsource data collection project. The facility then synchronizes the data by relying on identifying this pattern in all received data stream. The facility can automatically perform the processing and/or alignment of the data. In some embodiments, the facility interacts with a specialized crowd to gather input regarding the processing and/or alignment the data.

In step 205, the facility delivers results of executing part or all of the multimodal crowdsourced data collection project. In step 207, the facility charges the customer for the multimodal crowdsourced data collection project (e.g., by debiting the customer's account). After step 207, this process concludes.

Those skilled in the art will appreciate that the process shown in FIG. 2 may be altered in a variety of ways. For example, the order of the acts may be rearranged; some acts may be performed in parallel; shown acts may be omitted, or other acts may be included; a shown act may be divided into sub acts, or multiple shown acts may be combined into a single act, etc.

FIGS. 3-7 are display diagrams collectively showing a sample multimodal crowdsourced data collection project definition workflow presented by the facility in some embodiments. Those skilled in the art will appreciate that the workflow shown can be modified and adapted in a variety of ways, such as to accommodate additional kinds of sensors or devices, additional data sensing or data processing parameters of certain sensors or devices, different user interface techniques, etc.

Figure 3:
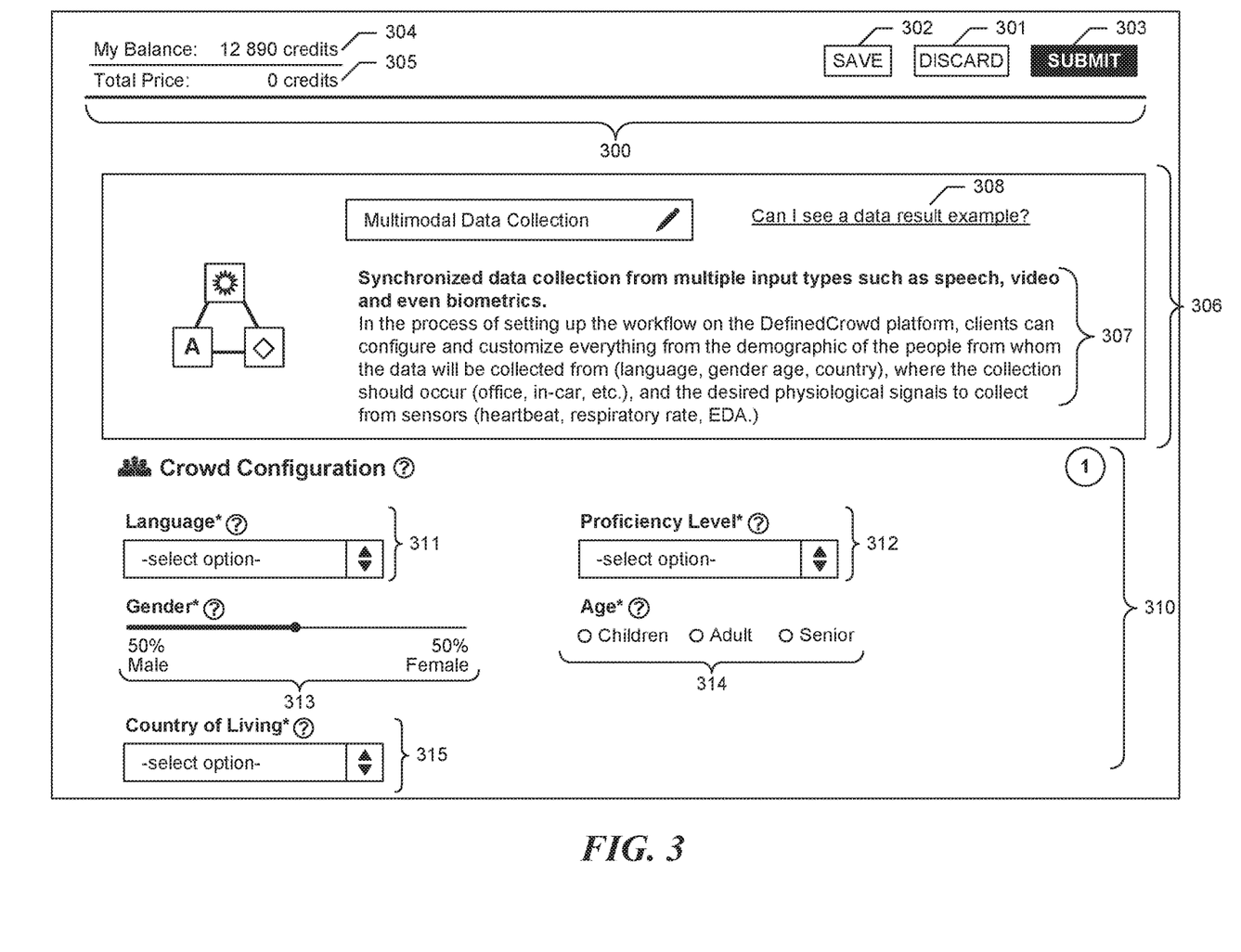
FIGS. 3-7 are display diagrams collectively showing a sample multimodal crowdsourced data collection project definition workflow presented by the facility in some embodiments.

FIG. 3 is a display diagram showing a first portion of the sample multimodal crowdsourced data collection project definition workflow presented by the facility in some embodiments. The sample workflow includes an overview area 300 that relates to the workflow as a whole, rather than any individual part of the workflow. The overview area includes a discard control 301 that the user can activate—such as by clicking on it with a mouse, touching it with a finger or stylus, speaking the word it bears, etc.—to delete the details currently specified in the workflow and begin again. The overview area also includes a save control that the user can activate in order to persistently store the details currently specified in the workflow—such as in connection with the customer's customer account—to return to later. The overview area further includes a submit control 303 that the user can activate in order to create and launch a project based upon the details currently specified in the workflow. The overview area also includes a customer balance indication 304 indicating the amount of money or credit the current customer has on deposit with the crowdsourcing platform. The overview area also includes a project price indication 305 indicating the amount of money or credit the customer will be charged if the customer creates and launches the project presently specified by the customer in the workflow. If the amount of money or credit the current customer has on deposit with the crowdsourcing platform is less than the project price, the overview area includes an exception indication informing the customer that the current balance is low and the difference between the two amounts. In several embodiments, an account associated with the customer (e.g., credit card account, debit card account, user funds account, etc.) is accessed to provide the required funds. The customer can be prompted to provide account information and/or a default option is used. The facility debits the selected account the difference between the two amounts.

The sample workflow also includes an introductory area 306 that describes the process of defining a sample multimodal crowdsourced data collection project using the workflow. The introductory area includes descriptive text 307, and a link 308 to sample data results from a multimodal crowdsourced data collection project. In some embodiments, the sample multimodal crowdsourced data collection project is selected from a set of multimodal crowdsourced data collection projects based on similarities between requirements and parameters selected by the customer and those of the multimodal crowd source data collection projects.

The sample workflow also includes a first, "Crowd Configuration" substantive section 310 for establishing demographic requirements for the workers who elect or are assigned to the project. These workers are sometimes referred to in the sample workflow as a "crowd." The Crowd Configuration section heading, and many of the other section headings and the project attribute value selection controls inside them, are accompanied by "more information" icons each shown as a question mark in a circle. The user can click on or hover over these to display more information about the section or project attribute.

The Crowd Configuration section includes a language attribute value selection control 311 that the user can use to specify a language that must be spoken by members of the crowd. The language attribute value selection control, and some of the other attribute value selection controls, include an asterisk, indicating that the user must specify a value for the corresponding attribute. In various embodiments, the facility requires values for a variety of subsets of the attributes, some different from the subset shown. The Crowd Configuration section further includes a language proficiency level attribute value selection control 312 that the user can use to specify the minimum proficiency level in the language that members of the crowd must have. The Crowd Configuration section further includes a gender distribution attribute value selection control 313 that the user can use to specify a target gender split for the crowd. The Crowd Configuration section further includes an age range attribute value selection control 314 that the user can use to specify a target age range for the crowd. The Crowd Configuration section further includes a country attribute value selection control 315 that the user can use to specify a country in which members of the crowd should live.

Figure 4:
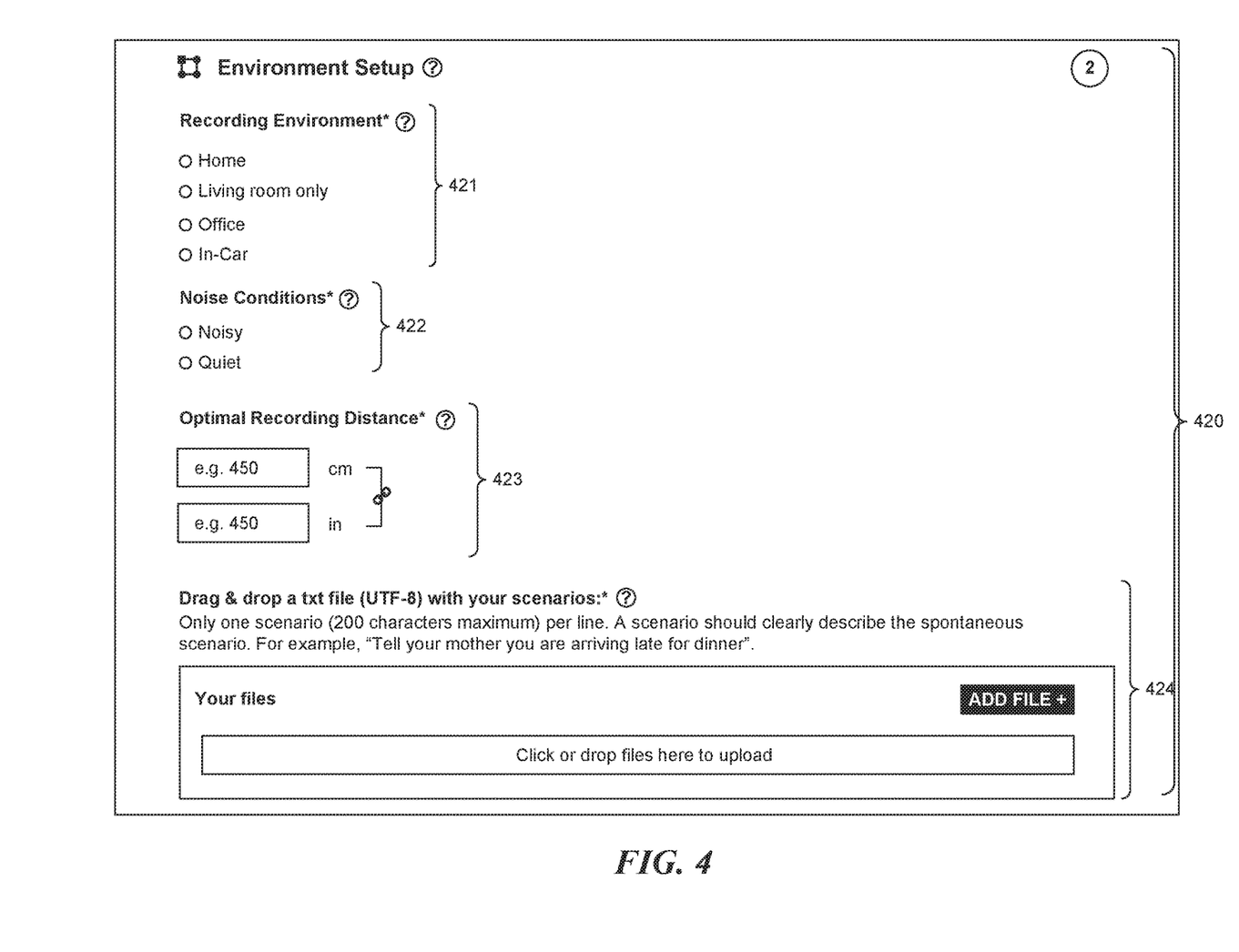

FIG. 4 is a display diagram showing a second portion of the sample multimodal crowdsourced data collection project definition workflow presented by the facility in some embodiments. The sample workflow also includes a second, "Environment Setup" substantive section 420 for establishing details regarding the physical environment in which workers should perform the project. The Environment Setup section includes a recording environment attribute value selection control 421 that the user can use to specify the type of room or other space in which the workers should perform the project. The Environment Setup section further includes a noise conditions attribute value selection control 422 that the user can use to specify the ambient noise level at which the worker should perform the project. The Environment Setup section further includes an optimal recording distance attribute value selection control 423 that the user can use to specify how far away from a microphone used to record audio the workers and any assistants should be while performing the problem. The Environment Setup section further includes a control 424 that the user can use to specify textual descriptions and/or instructions for conducting each of one or more scenarios as part of the project. This can include, for example, a subject to be discussed, an action or activity to be performed, an opinion to be expressed, an emotion to be portrayed, a picture or video to be viewed, etc. In various embodiments, this control can be used to upload text files, directly type or dictate text, upload audio files, record audio, upload video files, record video, etc.

Figure 5:
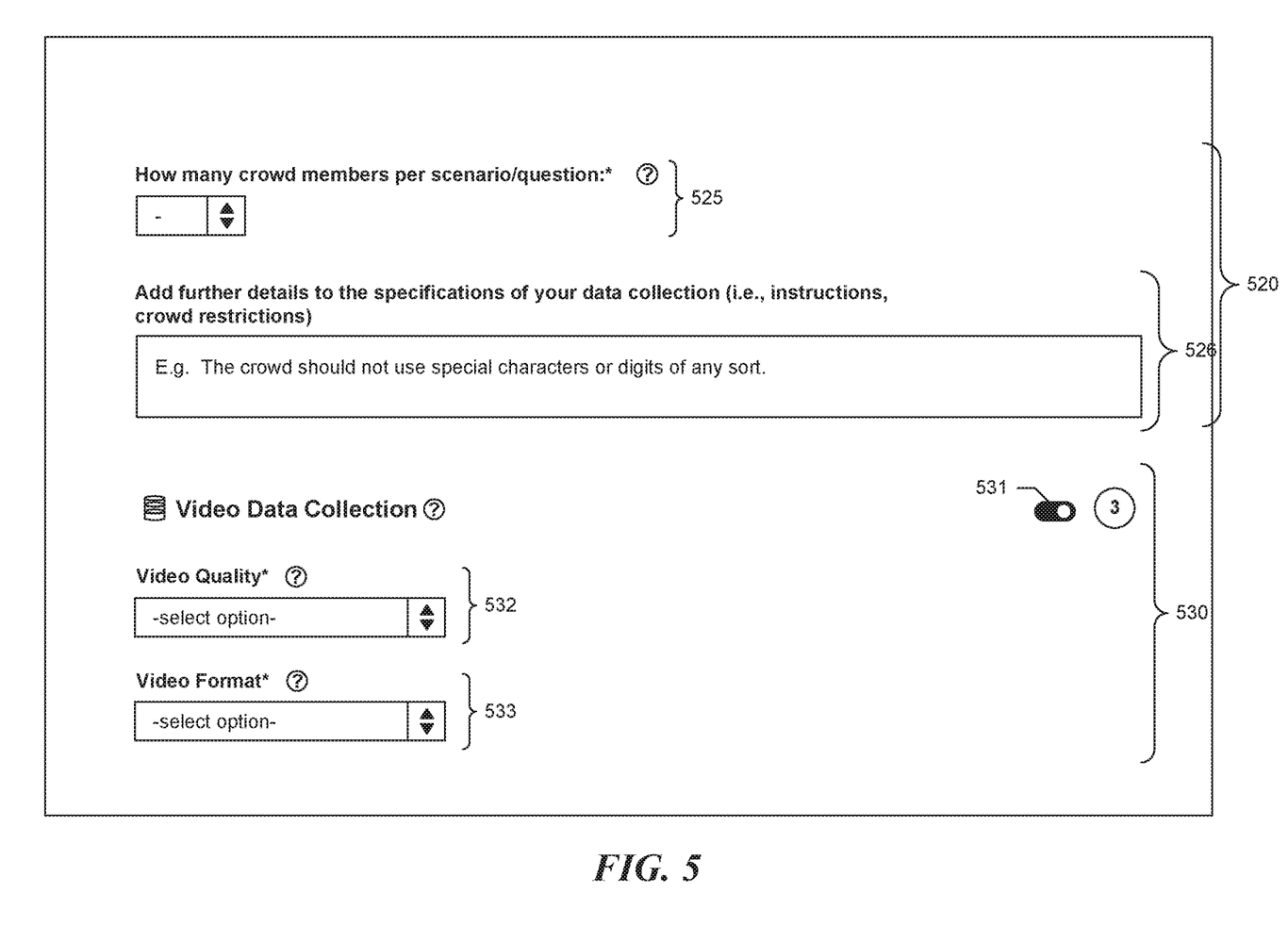

FIG. 5 is a display diagram showing a third portion of the sample multimodal crowdsourced data collection project definition workflow presented by the facility in some embodiments. The second, "Environmental Setup" substantive section continues in FIG. 5 at reference number 520. The Environment Setup section further includes a control 525 that the user can use to specify how many times each scenario is repeated by a different worker. The Environment Setup section further includes a control 526 that the user can use to specify notes about how the project should be performed.

The sample workflow further includes a third, "Video Data Collection" substantive section 530 to specify values for video data collection parameters for projects in which video data is to be collected. The Video Data Collection section includes a section toggle control 531 that the user can use to specify whether video data is to be collected as part of the project. It should be noted that, in some embodiments, the asterisks included with the parameter value selection controls included in the Video Data Collection section and other substantive sections subject to section toggle controls indicate that the corresponding parameter values are required only in the case where the toggle control is toggled on for the substantive section. The Video Data Collection section further includes a video quality attribute value selection control 532 that the user can use to specify the video quality level at which the worker is to collect video data for the project. The Video Data Collection section further includes a video format attribute value selection control 532 that the user can use to specify the video format in which the worker is to collect video data for the project.

Figure 6:
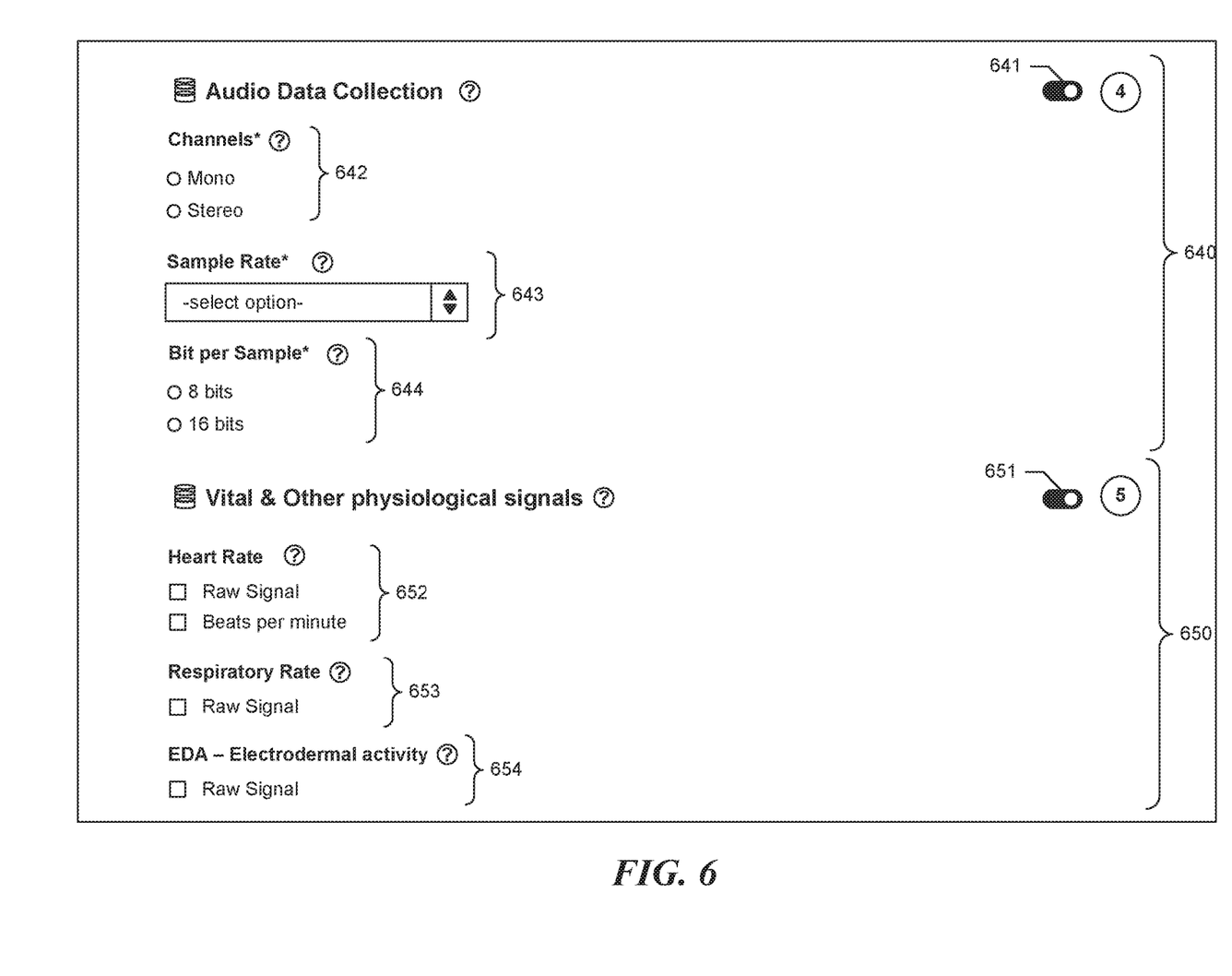

FIG. 6 is a display diagram showing a fourth portion of the sample multimodal crowdsourced data collection project definition workflow presented by the facility in some embodiments. The sample workflow further includes a fourth, "Audio Data Collection" substantive section 640 to specify values for audio data collection parameters for projects in which audio data is to be collected. The Audio Data Collection section includes a section toggle control 641 that the user can use to specify whether audio data is to be collected as part of the project. The Audio Data Collection section includes a channels attribute value selection control 642 that the user can use to specify how many channels workers are to use for audio data collection. The Audio Data Collection section further includes a sample rate value selection control 643 that the user can use to specify an audio sampling rate that is to be used by the worker to record audio. The Audio Data Collection section further includes a bits per sample attribute value selection control 644 that the user can use to specify the number of bids with which the worker is to represent audio collected during each sampling period.

The sample workflow further includes a fifth, "Vital & Other physiological signals" substantive section 650 to specify values for physiological data collection parameters for projects in which physiological data is to be collected. The Vital & Other physiological signals section includes a section toggle control 651 that the user can use to specify whether physiological data is to be collected as part of the project. The Vital & Other physiological signals section includes a heart rate attribute value selection control 652 that the user can use to specify whether a hard rate raw signal and/or a heart rate beats per minute metric are to be collected. The Vital & Other physiological signals section further includes a respiratory rate value selection control 653 that the user can use to specify whether a respiratory rate raw signal it is to be collected. The Vital & Other physiological signals section further includes an EDA attribute value selection control 653 that the user can use to specify whether an electrodermal activity raw signal it is to be collected.

Figure 7:
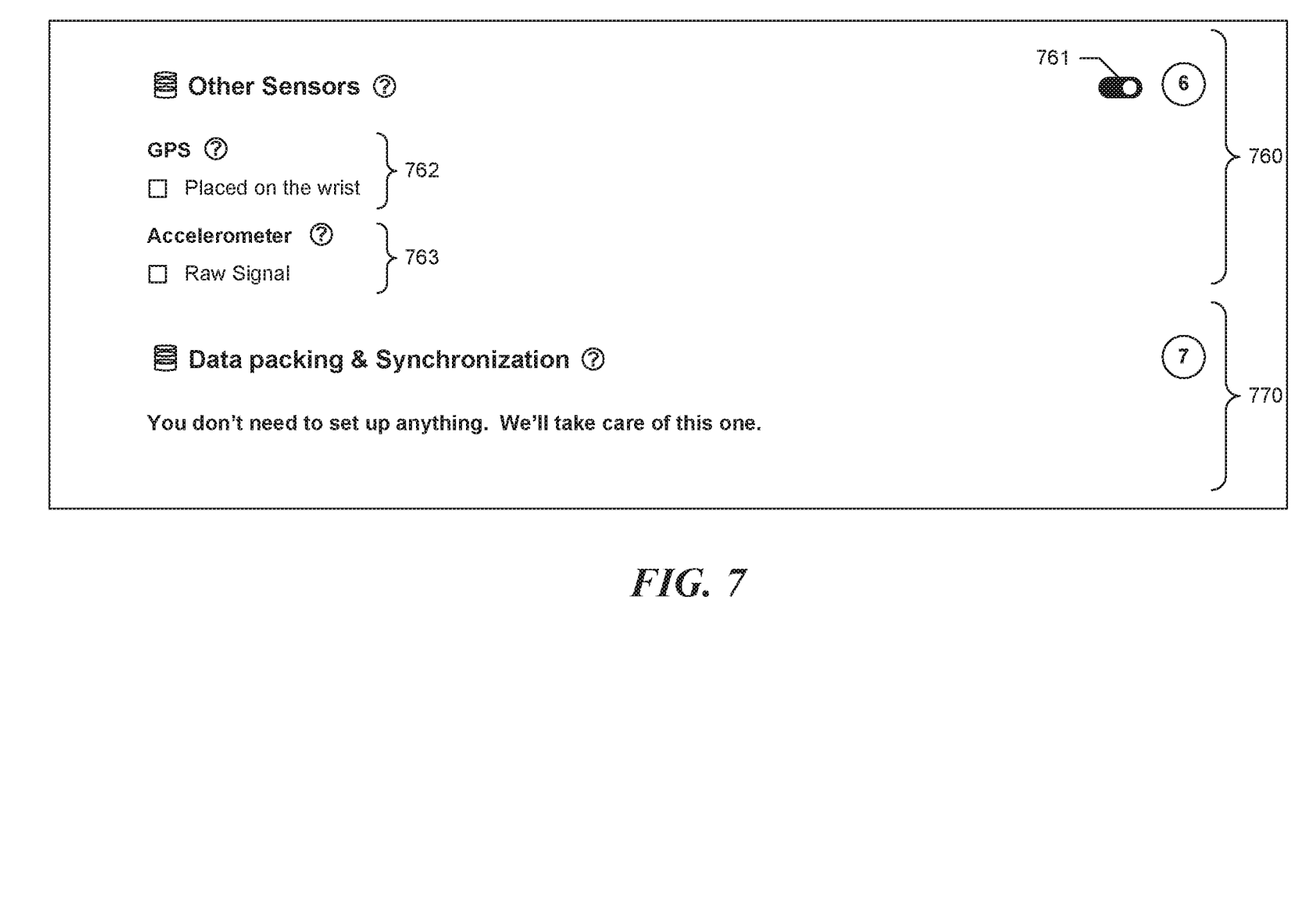

FIG. 7 is a display diagram showing a fifth portion of the sample multimodal crowdsourced data collection project definition workflow presented by the facility in some embodiments. The sample workflow further includes a sixth, "Other Sensors" substantive section 760 to specify values for location-related data collection parameters for projects in which location-related data is to be collected. The Other Sensors section includes a section toggle control 761 that the user can use to specify whether location-related data is to be collected as part of the project. The Other Sensors section includes a GPS attribute value selection control 652 that the user can use to specify whether a wrist-worn GPS signal is to be collected. The Other Sensors section further includes an accelerometer value selection control 653 that the user can use to specify whether an accelerometer raw signal is to be collected.

The sample workflow further includes a seventh, "Data packing & Synchronization" substantive section 770. The Data packing & Synchronization section provides an indication that the data specified by the user for collection during the project will be packaged together in a time-synchronized manner.

Figure 8:
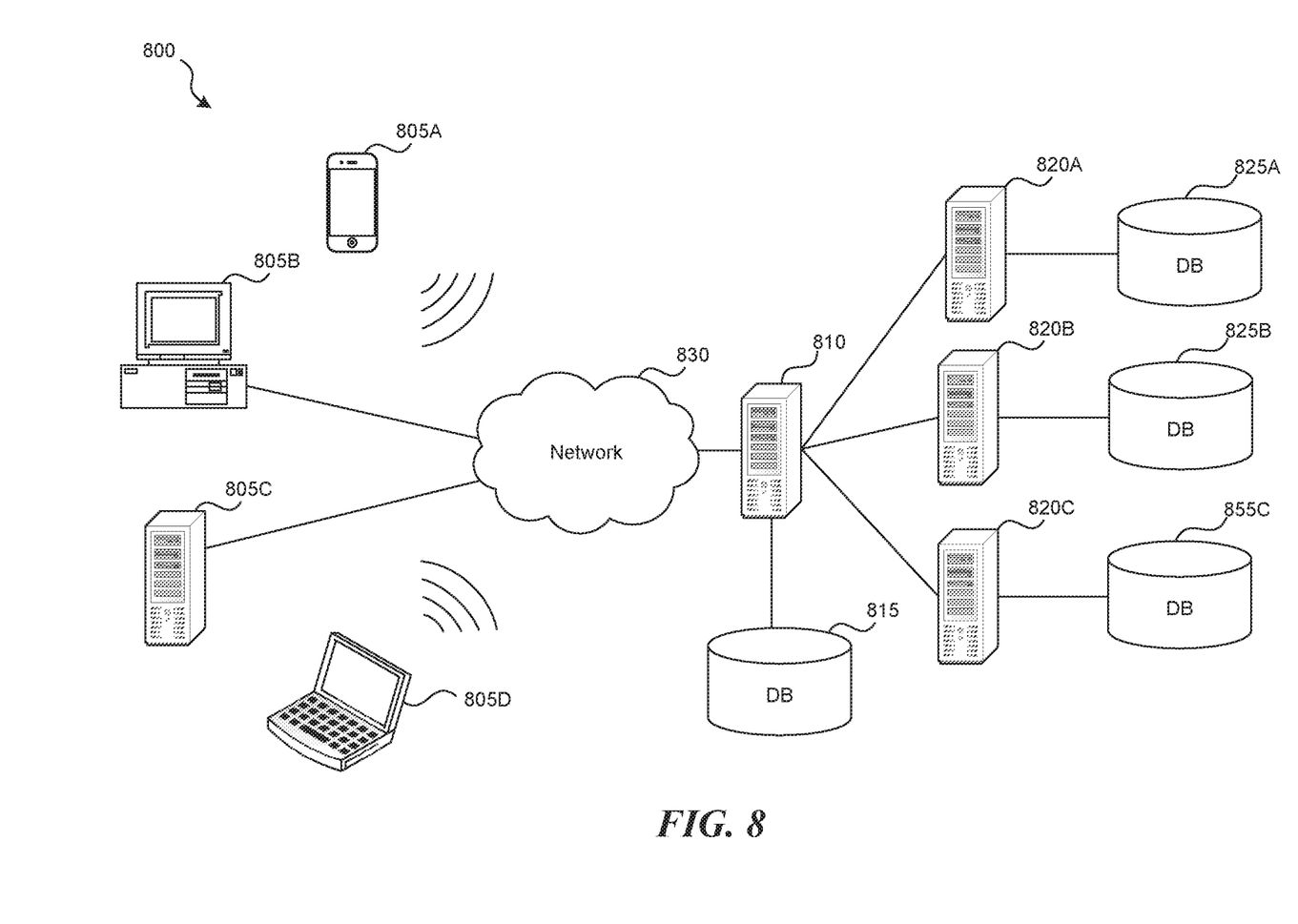
FIG. 8 is a system diagram illustrating an example of a computing environment in which the facility operates in some embodiments.

FIG. 8 is a system diagram illustrating an example of a computing environment in which the facility operates in some embodiments. In some implementations, environment 800 includes one or more client computing devices 805A-D, examples of which can include computer system 100. Client computing devices 805 operate in a networked environment using logical connections 810 through network 830 to one or more remote computers, such as a server computing device.

In some implementations, server 810 is an edge server which receives client requests and coordinates fulfillment of those requests through other servers, such as servers 820A-C. In some implementations, server computing devices 810 and 820 comprise computing systems, such as computer system 100. Though each server computing device 810 and 820 is displayed logically as a single server, server computing devices can each be a distributed computing environment encompassing multiple computing devices located at the same or at geographically disparate physical locations. In some implementations, each server 820 corresponds to a group of servers.

Client computing devices 805 and server computing devices 810 and 820 can each act as a server or client to other server/client devices. In some implementations, servers (810, 820A-C) connect to a corresponding database (815, 825A-C). As discussed above, each server 820 can correspond to a group of servers, and each of these servers can share a database or can have their own database. Databases 815 and 825 warehouse (e.g. store) information such as user data (e.g., user identifiers, user profiles, etc.), task data (e.g., task identifiers, correct result(s), task steps, etc.), user history, user scores, etc. Though databases 815 and 825 are displayed logically as single units, databases 815 and 825 can each be a distributed computing environment encompassing multiple computing devices, can be located within their corresponding server, or can be located at the same or at geographically disparate physical locations.

Network 830 can be a local area network (LAN) or a wide area network (WAN), but can also be other wired or wireless networks. In some implementations, network 830 is the Internet or some other public or private network. Client computing devices 805 are connected to network 830 through a network interface, such as by wired or wireless communication. While the connections between server 810 and servers 820 are shown as separate connections, these connections can be any kind of local, wide area, wired, or wireless network, including network 830 or a separate public or private network.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system comprising:
providing a user interface for defining, in a crowdsourcing platform, a crowdsourced project for collecting multimodal data from a set of crowdsourced workers while at least some of the crowdsourced workers perform an action associated with the crowdsourced project, the providing comprising:
  causing to be displayed at the user interface one or more first controls for specifying worker requirements or project environment parameters;
  defining worker requirements or project environment parameters for the crowdsourced project in response to first user input operating the first controls;
  causing to be displayed at the user interface one or more second controls for specifying project parameters relating to collection of one or more of the following types of data: video data, audio data, physiological data, or location-related data;
  defining project parameters relating to collection of values of two or more of the displayed types of data for the crowdsourced project in response to second user input operating the second controls; and
  causing to be displayed at the user interface a discard control for discarding one or more of the defined worker requirements, the defined project environment parameters, or the defined project parameters, wherein in response to receiving user input activating the discard control, deleting the one or more of the defined worker requirements, the defined project environment parameters, or the defined project parameters corresponding the user input activating the discard control;
causing, by the crowdsourcing platform, at least one sensor associated with each of a plurality of crowdsourced workers to collect the values of the defined project parameters from each of the plurality of crowdsourced workers while the crowdsourced workers perform the action associated with the crowdsourced project; and
packaging, by the crowdsourcing platform, the values collected from the at least one sensor associated with each of the plurality of crowdsourced workers by automatically aligning time sequences of values generated by the at least one sensor associated with each crowdsourced worker relative to a time during each crowdsourced worker's performance of the action, the alignment comprising:
  processing a first time sequence of values generated, during a first time interval, by a first sensor associated with a first crowdsourced worker to detect a first burst signal in the first time sequence of values emitted at a first time during the first crowdsourced worker's performance of the action;
  processing a second time sequence of values generated, during a second time interval different than the first time interval, by a second sensor associated with a second crowdsourced worker to detect a second burst signal in the second time sequence of values emitted at a second time during the second crowdsourced worker's performance of the action; and
  synchronizing the first time sequence of values with the second time sequence of values by temporally aligning:
    (a) the first burst signal in the first time sequence of values emitted at the first time during the first crowdsourced worker's performance of the action, with
    (b) the second burst signal in the second time sequence of values emitted at the second time during the second crowdsourced worker's performance of the action.

2. The method of claim 1, further comprising:
causing to be displayed at the user interface a submit control for submitting defined values of the defined worker requirements, the defined project environment parameters, and the defined project parameters, wherein in response to receiving user input activating the submit control, the method further comprises:
creating a crowdsourced project definition for collecting multimodal data from a set of workers using the defined values of the defined worker requirements, the defined project environment parameters, and the defined project parameters; and
storing the created crowdsourced project definition in a data storage repository.

3. The method of claim 1, further comprising:
causing to be displayed at the user interface a save control for saving defined requirements or parameters, wherein in response to receiving user input activating the save control, each of the defined worker requirements, the defined project environment parameters, and the defined project parameters are saved in a data storage repository.

4. The method of claim 1, further comprising:
causing to be displayed at the user interface a customer balance indication indicating an amount of money or credit a current customer has on deposit in an internal account associated with the crowdsourcing platform,
causing to be displayed at the user interface a project price indication indicating an amount of money or credit the current customer will be charged when the customer creates and launches a selected crowdsourced project; and
when the project price indication amount is greater than the customer balance indication amount, causing to be displayed at the user interface an exception indication indicating a difference between the project price indication amount and the customer balance indication amount.

5. The method of claim 4 further comprising:
when the project price indication amount is less than the customer balance indication amount, debiting from an external customer account, the project price indication amount.

6. The method of claim 1, further comprising:
causing to be displayed at the user interface a link to sample data results, wherein in response to receiving user input activating the link, results of executing a sample multimodal crowdsourced data collection project are displayed at the user interface, wherein the sample multimodal crowdsourced data collection project is selected from a set of sample multimodal crowdsourced data collection projects based on similarities between (1) the defined worker requirements, the defined project environment parameters, and the defined project parameters and (2) requirements and parameters of multimodal crowdsourced data collection projects in the set of sample multimodal crowdsourced data collection projects.

7. The method of claim 1, wherein data relating to the defined project parameters is collected using one or more user devices comprising one or more of the following:
microphone,
image sensor,
location sensor,
orientation sensor,
accelerometer,
gyroscope,
pedometer,
magnetometer,
compass,
proximity sensor,
photometer,
barometer,
thermometer,
air humidity sensor,
ionizing radiation sensor,
heart rate sensor,
respiration rate sensor,
electrodermal activity sensor,
blood oxygen saturation sensor,
blood spectrometry sensor,
physical activity type sensor,
temperature sensor,
elevation sensor,
location sensor,
orientation sensor,
acceleration in one-to-three dimensions sensor,
ambient light level sensor, or
any combination thereof.

8. The method of claim 1,
wherein the first sensor associated with the first crowdsourced worker is a first type of sensor; and
the second sensor associated with the second crowdsourced worker is a second type of sensor that is different from the first type of sensor.

9. The method of claim 1, wherein the first sensor associated with the first crowdsourced worker is a first type of sensor, and wherein the method further comprises:
processing a third time sequence of values generated, at a third time, by a third sensor associated with the first crowdsourced worker to detect a third burst signal in the third time sequence of values; and
temporally aligning the first burst signal with the third burst signal to align the first time sequence of values with the third time sequence of values.

10. A computer-readable storage medium excluding transitory signals and carrying instructions that, when executed, are capable of causing a computing system to perform a method comprising:
providing a user interface for defining, in a crowdsourcing platform, a crowdsourced project for collecting multimodal data from a set of crowdsourced workers while at least some of the crowdsourced workers perform an action associated with the crowdsourced project, the providing comprising:
causing to be displayed at the user interface one or more first controls for specifying worker requirements or project environment parameters;
defining worker requirements or project environment parameters for the crowdsourced project in response to first user input operating the first controls;
causing to be displayed at the user interface one or more second controls for specifying project parameters relating to collection of one or more of the following types of data: image data, video data, audio data, physiological data, or location-related data;
defining project parameters relating to collection of values of two or more of the displayed types of data for the crowdsourced project in response to second user input operating the second controls; and
causing to be displayed at the user interface a discard control for discarding one or more of the defined worker requirements, the defined project environment parameters, or the defined project parameters, and in response to receiving user input activating the discard control, deleting the one or more of the defined worker requirements, the defined project environment parameters, or the defined project parameters corresponding the user input activating the discard control;
causing, by the crowdsourcing platform, at least one sensor associated with each of a plurality of crowdsourced workers to collect the values of the defined project parameters from each of the plurality of crowdsourced workers while the crowdsourced workers perform the action associated with the crowdsourced project; and
packaging, by the crowdsourcing platform, the values collected from the at least one sensor associated with each of the plurality of crowdsourced workers by automatically aligning time sequences of values generated by the at least one sensor associated with each crowdsourced worker relative to a time during each crowdsourced worker's performance of the action, the alignment comprising:
processing a first time sequence of values generated, during a first time interval, by a first sensor associated with a first crowdsourced worker to detect a first burst signal in the first time sequence of values emitted at a first time during the first crowdsourced worker's performance of the action;
processing a second time sequence of values generated, during a second time interval different than the first time interval, by a second sensor associated with a second crowdsourced worker to detect a second burst signal in the second time sequence of values emitted at a second time during the second crowdsourced worker's performance of the action; and
synchronizing the first time sequence of values with the second time sequence of values by temporally aligning:
(a) the first burst signal in the first time sequence of values emitted at the first time during the first crowdsourced worker's performance of the action, with
(b) the second burst signal in the second time sequence of values emitted at the second time during the second crowdsourced worker's performance of the action.

11. The computer-readable storage medium of claim 10, wherein the method further comprises:
causing to be displayed at the user interface a submit control for submitting defined values of the defined worker requirements, the defined project environment parameters, and the defined project parameters, wherein in response to receiving user input activating the submit control, the method further comprises:

creating a crowdsourced project definition for collecting multimodal data from a set of workers using the defined values of the defined worker requirements, the defined project environment parameters, and the defined project parameters; and storing the created crowdsourced project definition in a data storage repository.

12. The computer-readable storage medium of claim 10, wherein the method further comprises:

causing to be displayed at the user interface a save control for saving defined requirements or parameters, wherein in response to receiving user input activating the save control, each of the defined worker requirements, the defined project environment parameters, and the defined project parameters are saved in a data storage repository.

13. The computer-readable storage medium of claim 10, wherein the method further comprises:

causing to be displayed at the user interface a customer balance indication indicating an amount of money or credit a current customer has on deposit in an internal account associated with the crowdsourcing platform, causing to be displayed at the user interface a project price indication indicating an amount of money or credit the current customer will be charged when the customer creates and launches a selected crowdsourced project; and when the project price indication amount is greater than the customer balance indication amount, causing to be displayed at the user interface an exception indication indicating a difference between the project price indication amount and the customer balance indication amount.

14. The computer-readable storage medium of claim 10, wherein the method further comprises:

when the project price indication amount is less than the customer balance indication amount, debiting from an external customer account, the project price indication amount.

15. The computer-readable storage medium of claim 10, wherein the method further comprises:

causing to be displayed at the user interface a link to sample data results, wherein in response to receiving user input activating the link, results of executing a sample multimodal crowdsourced data collection project are displayed at the user interface, wherein the sample multimodal crowdsourced data collection project is selected from a set of sample multimodal crowdsourced data collection projects based on similarities between (1) the defined worker requirements, the defined project environment parameters, and the defined project parameters and (2) requirements and parameters of multimodal crowdsourced data collection projects in the set of sample multimodal crowdsourced data collection projects.

16. The computer-readable storage medium of claim 10, data relating to the defined project parameters is collected using one or more user devices comprising one or more of the following:

microphone,
image sensor,
location sensor,
orientation sensor,
accelerometer,
gyroscope,
pedometer,
magnetometer,
compass,
proximity sensor,
photometer,
barometer,
thermometer,
air humidity sensor,
ionizing radiation sensor,
heart rate sensor,
respiration rate sensor,
electrodermal activity sensor,
blood oxygen saturation sensor,
blood spectrometry sensor,
physical activity type sensor,
temperature sensor,
elevation sensor,
location sensor,
orientation sensor,
acceleration in one-to-three dimensions sensor,
ambient light level sensor, or
any combination thereof.

17. A method in a computing system comprising:

providing a user interface for defining, in a crowdsourcing platform, a crowdsourced project for collecting multimodal data from a set of crowdsourced workers while at least some of the crowdsourced workers perform an action associated with the crowdsourced project, the providing comprising:

causing to be displayed at the user interface one or more first controls for specifying worker requirements or project environment parameters;

defining worker requirements or project environment parameters for the crowdsourced project in response to first user input operating the first controls;

causing to be displayed at the user interface one or more second controls for specifying project parameters relating to collection of one or more of the following types of data: video data, audio data, physiological data, or location-related data;

defining project parameters relating to collection of values of two or more of the displayed types of data for the crowdsourced project in response to second user input operating the second controls;

causing to be displayed at the user interface a discard control for discarding one or more of the defined worker requirements, the defined project environment parameters, or the defined project parameters, wherein in response to receiving user input activating the discard control, deleting the one or more of the defined worker requirements, the defined project environment parameters, or the defined project parameters corresponding the user input activating the discard control; and causing to be displayed at the user interface a submit control for submitting defined values of the defined worker requirements, the defined project environment parameters, and the defined project parameters;

in response to receiving user input activating the submit control, creating a crowdsourced project definition for collecting multimodal data from a set of workers using the defined values of the defined worker requirements, the defined project environment parameters, and the defined project parameters;

conducting a crowdsourced project in accordance with the created crowdsourced project definition, wherein conducting the crowdsourced project in accordance with the created crowdsourced project definition comprises:
causing at least one sensor on a wearable device worn by each of a plurality of crowdsourced workers to collect values of one or more of the defined project parameters; and
packaging the values collected from the at least one sensor associated with each of the plurality of crowdsourced workers by automatically aligning time sequences of values generated by the at least one sensor associated with each crowdsourced worker relative to a time during each crowdsourced worker's performance of the action, the alignment comprising:
processing a first time sequence of values generated, during a first time interval, by a first sensor associated with a first crowdsourced worker to detect a first burst signal in the first time sequence of values emitted at a first time during the first crowdsourced worker's performance of the action;
processing a second time sequence of values generated, during a second time interval different than the first time interval, by a second sensor associated with a second crowdsourced worker to detect a second burst signal in the second time sequence of values emitted at a second time during the second crowdsourced worker's performance of the action; and
synchronizing the first time sequence of values with the second time sequence of values by temporally aligning:
(a) the first burst signal in the first time sequence of values emitted at the first time during the first crowdsourced worker's performance of the action, with
(b) the second burst signal in the second time sequence of values emitted at the second time during the second crowdsourced worker's performance of the action.

18. The method of claim 17 further comprising storing the created crowdsourced project definition in a data storage repository.

19. The method of claim 17 further comprising:
causing to be displayed at the user interface a customer balance indication indicating an amount of money or credit a current customer has on deposit in an internal account associated with the crowdsourcing platform;
causing to be displayed at the user interface a project price indication indicating an amount of money or credit the current customer will be charged when the customer creates and launches a selected crowdsourced project; and
when the project price indication amount is greater than the customer balance indication amount, causing to be displayed at the user interface an exception indication indicating a difference between the project price indication amount and the customer balance indication amount.

20. The method of claim 19 further comprising:
when the project price indication amount is less than the customer balance indication amount, debiting from an external customer account, the project price indication amount.

21. The method of claim 17 further comprising:
causing to be displayed at the user interface a link to sample data results, wherein in response to receiving user input activating the link, results of executing a sample multimodal crowdsourced data collection project are displayed at the user interface, wherein the sample multimodal crowdsourced data collection project is selected from a set of sample multimodal crowdsourced data collection projects based on similarities between (1) the defined worker requirements, the defined project environment parameters, and the defined project parameters and (2) requirements and parameters of multimodal crowdsourced data collection projects in the set of sample multimodal crowdsourced data collection projects.

22. The method of claim 17, wherein data relating to the defined project parameters is collected using one or more user devices comprising one or more of the following:
microphone,
image sensor,
location sensor,
orientation sensor,
accelerometer,
gyroscope,
pedometer,
magnetometer,
compass,
proximity sensor,
photometer,
barometer,
thermometer,
air humidity sensor,
ionizing radiation sensor,
heart rate sensor,
respiration rate sensor,
electrodermal activity sensor,
blood oxygen saturation sensor,
blood spectrometry sensor,
physical activity type sensor,
temperature sensor,
elevation sensor,
location sensor,
orientation sensor,
acceleration in one-to-three dimensions sensor,
ambient light level sensor, or
any combination thereof.

* * * * *